(12) United States Patent
Azzi et al.

(10) Patent No.: US 12,519,540 B2
(45) Date of Patent: Jan. 6, 2026

(54) WAVEGUIDE AND SMART NODE FAULT DIAGNOSTIC SYSTEM

(71) Applicant: RTX Corporation, Farmington, CT (US)

(72) Inventors: Sharbel Elias Azzi, Palm Beach Gardens, FL (US); Joseph V. Mantese, Ellington, CT (US); Gurkan Gok, Milford, CT (US); Joseph Zacchio, Wethersfield, CT (US); Andre M. Ajami, Henderson, CT (US); Jonathan J. Gilson, West Hartford, CT (US); Coy B. Wood, Ellington, CT (US)

(73) Assignee: RTX CORPORATION, Farmington, CT (US)

( * ) Notice: Subject to any disclaimer, the term of this patent is extended or adjusted under 35 U.S.C. 154(b) by 343 days.

(21) Appl. No.: 18/298,894

(22) Filed: Apr. 11, 2023

(65) Prior Publication Data
US 2024/0348330 A1    Oct. 17, 2024

(51) Int. Cl.
H04B 10/077    (2013.01)

(52) U.S. Cl.
CPC .................. H04B 10/077 (2013.01)

(58) Field of Classification Search
None
See application file for complete search history.

(56) References Cited

U.S. PATENT DOCUMENTS

| | | | |
|---|---|---|---|
| 7,061,251 B2 | 6/2006 | Taylor et al. | |
| 9,154,972 B2 | 10/2015 | Guterman et al. | |
| 11,533,105 B1 | 12/2022 | Williams et al. | |
| 2011/0181295 A1 | 7/2011 | Haugen et al. | |
| 2014/0266238 A1 | 9/2014 | Furse et al. | |
| 2016/0337512 A1* | 11/2016 | Kalavai | H04M 3/30 |
| 2022/0107277 A1 | 4/2022 | Gilson et al. | |

FOREIGN PATENT DOCUMENTS

| | | |
|---|---|---|
| CN | 104050371 B | 5/2017 |
| CN | 113625200 A | 11/2021 |

OTHER PUBLICATIONS

European Search Report for Application No. 24169809.1, mailed Sep. 3, 2024, 8 pages.

\* cited by examiner

Primary Examiner — David W Lambert
(74) Attorney, Agent, or Firm — CANTOR COLBURN LLP (57) ABSTRACT

A fault diagnostic system includes an RF network that implements a plurality of devices in signal communication with a plurality of nodes to exchange a plurality of signals. A first device includes a radio frequency transceiver, and a first waveguide extends from a first end coupled to the first device to an opposing second end located at a second location. A processor transmits a first radio frequency signal among the plurality of signals through the first waveguide toward the second end, and receives a second radio frequency signal among the plurality of signals, the second radio frequency signal generated in response to the first radio frequency signal. The processor further performs at least one S-parameter analysis based on the first radio frequency and the second radio frequency, and determines a presence of a fault in the radio frequency network based on the at least one S-parameter analysis.

16 Claims, 4 Drawing Sheets

WAVEGUIDE AND SMART NODE FAULT DIAGNOSTIC SYSTEM

BACKGROUND

Exemplary embodiments pertain to the art of radio frequency communication and, more particularly, to a system and method for diagnosing faults in a radio frequency waveguide system.

A machine can include a communication network that sends signals back and to enable operation of the machine. The communication network can include at least one radio frequency waveguide that defines a communication path between a controller at a first location of the machine and a node at a second location of the machine. The node can be a sensor that sends a parameter measurement related to the machine to the controller via a radio frequency (RF) signal transmitted through the waveguide or an actuator that performs an action at the machine when the controller sends an RF signal to it.

BRIEF DESCRIPTION

A fault diagnostic system includes an RF network that implements a plurality of devices in signal communication with a plurality of nodes to exchange a plurality of signals. A first device includes a radio frequency transceiver, and a first waveguide extends from a first end coupled to the first device to an opposing second end located at a second location. A processor transmits a first radio frequency signal among the plurality of signals through the first waveguide toward the second end, and receives a second radio frequency signal among the plurality of signals, the second radio frequency signal generated in response to the first radio frequency signal. The processor further performs at least one S-parameter analysis based on the first radio frequency and the second radio frequency, and determines a presence of a fault in the radio frequency network based on the at least one S-parameter analysis.

In addition to one or more features described herein, the at least one S-parameter analysis comprises determining at least one S-parameter coefficient based on the first radio frequency and the second radio frequency; comparing the at least one S-parameter coefficient to a threshold; and determining the presence of a fault in response to the at least one S-parameter coefficient being less than or greater than the threshold.

In addition to one or more features described herein, the RF network includes a second device among the plurality of devices. The second device includes a first port coupled to the second end of the first waveguide and including a second port coupled to a first end of a second wave guide.

In addition to one or more features described herein, the first radio frequency signal includes a first traveling wave (a1) that is incident on the first port, and the second radio frequency signal is a second traveling wave (b1) reflected from the first port.

In addition to one or more features described herein, determining the at least one S-parameter coefficient includes determining an input/forward reflection coefficient (S11) as a ratio of the second traveling wave (b1) with respect to the first traveling wave (a1).

In addition to one or more features described herein, the first radio frequency signal includes a first traveling wave (a1) that is incident on the first port, and the second radio frequency signal is a second traveling wave (b2) transmitted through the second port.

In addition to one or more features described herein, determining the at least one S-parameter coefficient includes determining an input/forward transmission coefficient (S21) as a ratio of the second traveling wave (b2) with respect to the first traveling wave (a1).

In addition to one or more features described herein, the first radio frequency signal includes a first traveling wave (a2) that is incident on the second port, and the second radio frequency signal is a second traveling wave (b2) reflected from the second port.

In addition to one or more features described herein, determining the at least one S-parameter coefficient includes determining an reverse reflection coefficient (S22) as a ratio of the second traveling wave (b2) with respect to the first traveling wave (a2).

In addition to one or more features described herein, the first radio frequency signal includes a first traveling wave (a2) that is incident on the second port, and the second radio frequency signal is a second traveling wave (b1) transmitted through the first port.

In addition to one or more features described herein, determining the at least one S-parameter coefficient includes determining a reverse transmission coefficient (S12) as a ratio of the second traveling wave (b1) with respect to the first traveling wave (a2).

According to another non-limiting embodiment, a method is provided to detect a fault in a radio frequency network including a plurality of devices in signal communication with a plurality of nodes to exchange a plurality of signals. The method includes transmitting a first radio frequency signal from a first device among the plurality of devices at a first location of the radio frequency network; delivering the first radio frequency signal from a first end of a first waveguide coupled to the first device toward an opposing second end of the waveguide, the second end located at a second location of the radio frequency network; and receiving a second radio frequency signal at the first device, the second radio frequency signal generated in response to the first radio frequency signal. The method further includes performing at least one S-parameter analysis based on the first radio frequency and the second radio frequency; and determining a presence of a fault in the radio frequency network based on the at least one S-parameter analysis.

In addition to one or more features described herein, determining the at least one S-parameter analysis comprises determining at least one S-parameter coefficient based on the first radio frequency and the second radio frequency; comparing the at least one S-parameter coefficient to a threshold; and determining the presence of a fault in response to the at least one S-parameter coefficient being less than or greater than the threshold.

In addition to one or more features described herein, the method further includes delivering at least one of the first radio frequency signal and the second radio frequency signal to a second device including a first port coupled to the second end of the waveguide and including a second port coupled to a first end of a second wave guide.

In addition to one or more features described herein, the first radio frequency signal includes a first traveling wave (a1) that is incident on the first port, and the second radio frequency signal includes a second traveling wave (b1) reflected from the first port.

In addition to one or more features described herein, determining the at least one S-parameter coefficient includes determining an input/forward reflection coefficient (S11) as a ratio of the second traveling wave (b1) with respect to the first traveling wave (a1).

In addition to one or more features described herein, the first radio frequency signal includes a first traveling wave (a1) that is incident on the first port, and the second radio frequency signal is a second traveling wave (b2) transmitted through the second port.

In addition to one or more features described herein, determining the at least one S-parameter coefficient includes determining an input/forward transmission coefficient (S21) as a ratio of the second traveling wave (b2) with respect to the first traveling wave (a1).

In addition to one or more features described herein, the first radio frequency signal includes a first traveling wave (a2) that is incident on the second port, and the second radio frequency signal is a second traveling wave (b2) reflected from the second port.

In addition to one or more features described herein, determining the at least one S-parameter coefficient includes determining an reverse reflection coefficient (S22) as a ratio of the second traveling wave (b2) with respect to the first traveling wave (a2).

In addition to one or more features described herein, the first radio frequency signal includes a first traveling wave (a2) that is incident on the second port, and the second radio frequency signal is a second traveling wave (b1) transmitted through the first port.

In addition to one or more features described herein, determining the at least one S-parameter coefficient includes determining reverse transmission coefficient (S12) as a ratio of the second traveling wave (b1) with respect to the first traveling wave (a2).

In addition to one or more features described herein, the threshold includes a range with a maximum threshold value (TH1) indicating a maximum amount of energy of a signal detected by the controller and a minimum value (TH0) indicating no amount of energy detected by the controller.

In addition to one or more features described herein, the input/forward reflection coefficient (S11) having a value of 0 indicates an existing open circuit in the radio frequency network and the input/forward reflection coefficient (S11) having a value of 1 indicates a short circuit in the in the radio frequency network.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Measurement systems can be used to observe various parameters to control machine operation and monitor system health. Some locations within a machine can be difficult to measure due to moving parts, internal operating environment, or machine configuration. Further, complex electronics used for sensing may not be suitable for higher temperature environments, such as proximate to fuel combustion locations. Environmental factors can also impact the accuracy of some measurement systems due to thermal expansion, vibration, strain, and other such factors which can vary during machine operation.

Waveguides have been employed to perform machine measurements in environments that are not suitable to support traditional sensors because the RF waves used to perform measurements that are not negatively affected by high-temperatures, vibrations, etc. Traditional waveguides, however, may still be susceptible to faults occurring in the wave guide body and/or one or more of the sensor nodes. As the waveguide deteriorates or is impaired, the operation of the machine can suffer. Therefore, there is a need to be able to diagnose a health of the waveguide.

One or more non-limiting embodiments of the present disclosure provides an in situ means of diagnosing failure modes in a guided electromagnetic transmission network, including one or more individual waveguides and waveguide devices (e.g., smart nodes), by monitoring changes in the power and signal reflections at various points in the waveguide connected network. Power and signal reflections indicated by S-parameters (also called S-matrix parameters or scattering parameters), for example, are analyzed by a controller such as a full authority digital engine (or electronics) control (FADEC) to assess power, transmission, absorption, and/or reflection in a radio frequency (RF) network. The S-parameters can represent the linear characteristics of a RF electronic circuit and/or components included in the RF circuit. By monitoring changes in the S-parameters, it is possible to assess whether the waveguide network and/or one or more smart nodes are no longer functioning correctly.

In addition, analysis of the S-parameters can be used to determine whether failures have occurred in the waveguide network (e.g., cracks, kinks, foreign object infiltrations, and/or complete disconnections associated with the waveguide network and/or one or more individual waveguides). In addition, the smart nodes and FADEC implemented in the waveguide network inherently have the ability to control RF signals transmitted through the waveguide. Accordingly, the smart nodes and the FADEC can be used to perform in situ prognostic health monitoring (PHM) by interrogating the network periodically to assess whether any faults have occurred, which smart nodes are functioning incorrectly, and where in the waveguide network a fault (e.g., cracks, kinks, foreign debris, liquid infiltration, and/or complete disconnections) exists.

In one or more non-limiting embodiments, the system employs features of a vector network analyzer (S-parameters, time domain reflectometry (TDR), etc.) into a waveguide network through an interposer and several smart nodes. The arrangements of the smart nodes and the interposer changes the spatial location of a transmitted/reflected signal, which can be measured and analyzed to facilitate spatial and nodal diagnostics. Accordingly, S-parameters and TDR analysis can be used to discover if a node is no longer functioning because its power draw is different. In addition, the S-parameters and TDR analysis can determine if there is a break or kink in a waveguide, and where that failure point is. The presence of FOD, water, will also impact S parameters.

Figure 1:
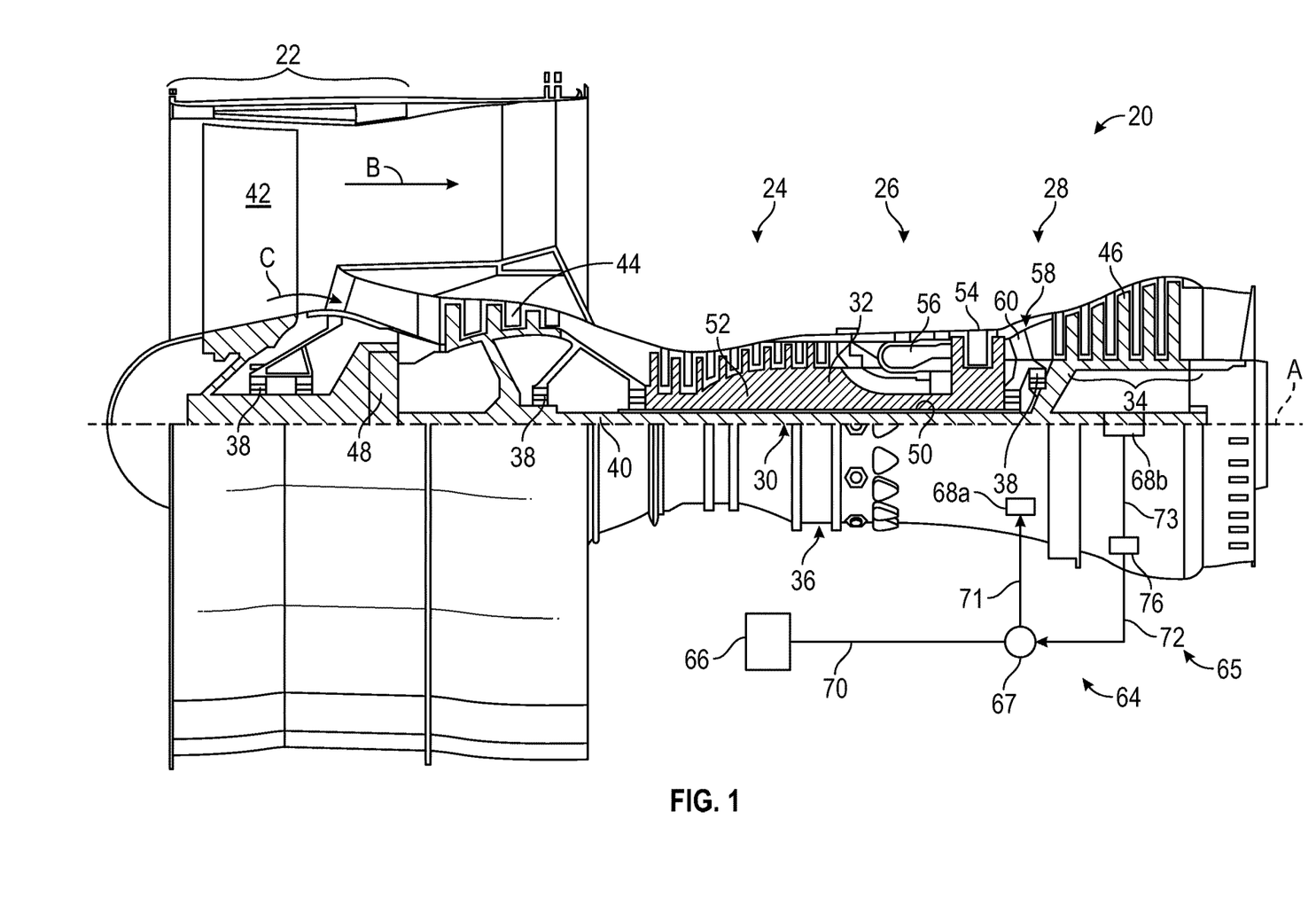
FIG. 1 schematically illustrates a gas turbine engine of an aircraft as one example of a machine as further described herein.

With reference now to FIG. 1 a gas turbine engine 20 of an aircraft is schematically illustrated as one example of a machine according to one or more non-limiting embodiments as further described herein. The gas turbine engine 20 is depicted as a two-spool turbofan that generally incorporates a fan section 22, a compressor section 24, a combustor section 26 and a turbine section 28. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low-speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low-speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low-speed spool 30. The high-speed spool 32 includes an outer shaft 50 that interconnects a second (or high) pressure compressor 52 and a second (or high) pressure turbine 54. A combustor 56 is arranged in exemplary gas turbine engine 20 between the high-pressure compressor 52 and the high-pressure turbine 54. A mid-turbine frame 58 of the engine static structure 36 is arranged generally between the high-pressure turbine 54 and the low-pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low pressure turbine 46. The mid-turbine frame 58 includes airfoils 60 which are in the core airflow path C. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low-pressure turbine 46 as related to the pressure at the outlet of the low-pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low-pressure turbine 46 and the number of blades in the fan section 22 can establish increased power transfer efficiency.

The disclosed example gas turbine engine 20 includes a control and waveguide/smart node fault diagnostic system 64 (generally referred to as system 64) utilized to monitor component performance and function. The system 64 includes a network 65, which is an example of a guided electromagnetic transmission network. The network 65 includes a controller 66 such as a FADEC, for example, which is operable to communicate with nodes 68a, 68b through electromagnetic signals. The nodes 68a, 68b can be distributed throughout the gas turbine engine 20 or other such machine. Node 68a is an example of an actuator node that can drive one or more actuators/effectors of the gas turbine engine 20. Node 68 b is an example of a sensor node that can interface with one or more sensors of the gas turbine engine 20. Nodes 68a, 68b can include processing support circuitry to transmit/receive electromagnetic signals between sensors or actuators and the controller 66. A coupler 67 can be configured as a splitter between a waveguide 70 coupled to the controller 66 and waveguides 71 and 72 configured to establish wireless communication with nodes 68a and 68b, respectively. The coupler 67 can be a simple splitter or may include a repeater function to condition electromagnetic signals sent between the controller 66 and nodes 68a, 68b.

In the example of FIG. 1, a radio frequency-based repeater 76 (sometimes referred to as an "interposer") is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the radio frequencies (e.g., electromagnetic signals) between the controller 66 and one or more of the nodes 68a, 68b. The transmission media within waveguides 70-73 may include dielectric or gaseous material. In embodiments, the waveguides 70-73 can be hollow metal tubes. The waveguides 70-73 may be rigid or may include flexible material. The disclosed system 64 may be utilized to control and/or monitor any component function or characteristic of a turbomachine, aircraft component operation, and/or other machines.

Exemplary embodiments can use radio frequencies guided by the waveguides 70-73 in a wireless architecture to provide both electromagnetic communication signals and power to the individual elements of the network 65. The use of electromagnetic radiation in the form of radio waves (MHz to GHz) to communicate and power the sensors and actuators vs. using a traditionally complex wired system provides substantial architectural simplification, especially as it pertains to size, weight, and power (SWaP). Embodiments provide extension of a network where reduced SNR may compromise network performance by trading off data rates for an expansion of the number of nodes and distribution lines; thereby providing more nodes/sensors, with greater interconnectivity.

Figure 2:
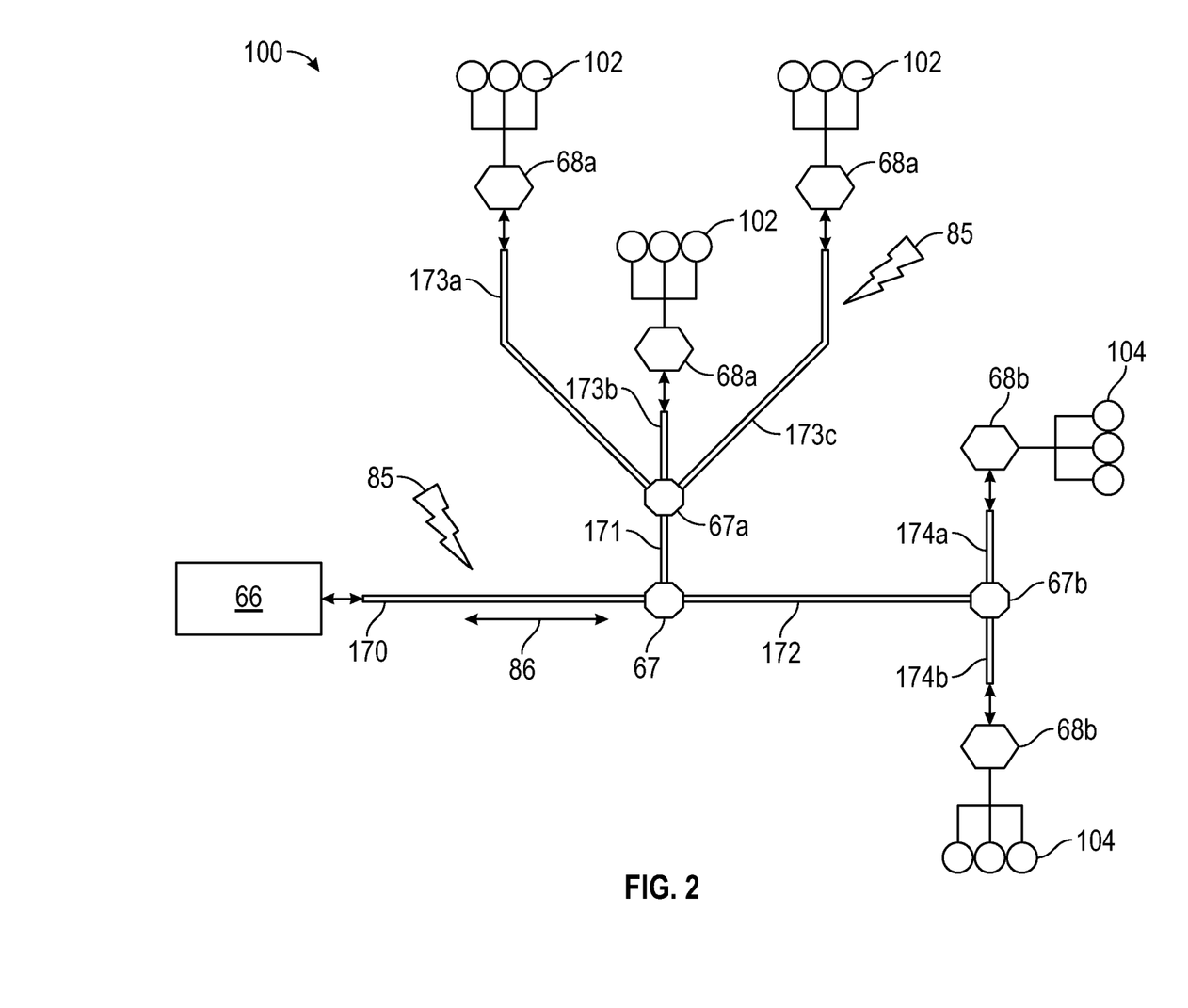
FIG. 2 illustrates a guided electromagnetic transmission network as an example expansion of the network of FIG. 1.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67*a* through waveguide 171 and to coupler 67*b* through waveguide 172. Coupler 67*a* is further coupled to three nodes 68*a* through waveguides 173*a*, 173*b*, 173*c* in parallel.

Each of the nodes 68*a* can interface or be combined with multiple actuators 102. Coupler 67*b* is also coupled to two nodes 68*b* through waveguides 174*a*, 174*b* in parallel. Each of the nodes 68*b* can interface or be combined with multiple sensors 104. Although the example of FIG. 2 depicts connections to actuators 102 and sensors 104 isolated to different branches, it will be understood that actuators 102 and sensors 104 can be interspersed with each other and need not be isolated on dedicated branches of the guided electromagnetic transmission network 100. Couplers 67, 67*a*, 67*b* can be splitters and/or can incorporate instances of the radio frequency-based repeater 76 of FIG. 1. Further, one or more instances of the radio frequency-based repeater 76 can be installed at any of the waveguides 170, 171, 172, 173*a-c*, and/or 174*a-b* depending on the signal requirements of the guided electromagnetic transmission network 100.

Nodes 68*a*, 68*b* can be associated with particular engine components, actuators or any other machine part from which information and communication is performed for monitoring and/or control purposes. The nodes 68*a*, 68*b* may contain a single or multiple electronic circuits or sensors configured to communicate over the guided electromagnetic transmission network 100.

The controller 66 can send and receive power and data to and from the nodes 68*a*, 68*b*. The controller 66 may be located on equipment near other system components or located remotely as desired to meet application requirements. According to one or more non-limiting embodiments, the controller 66 implements a vector network analyzer (VNA) capable of performing various signal measurement, analysis, and integrity characterization operations including, but not limited to, S-parameter analysis and time domain reflectometry (TDR). In terms of VNA, the controller 66 can measure power of signal waves (e.g., RF waves) that enter and exit the guided electromagnetic transmission network 100, and/or more the waveguides 170, 171, 172, 173*a-c*, and/or 174*a-b*, and/or one or more of the nodes 68*a*, 68*b*, and determine the amplitude and phase at every point and/or between multiple ports. In this manner, the controller 66 can determine S-parameters, which in turn can be used to assess signal transmission, signal absorption, and/or signal reflection the guided electromagnetic transmission network 100.

In one or more non-limiting embodiments, the controller 66 can perform waveguide and/or smart node fault diagnostics by monitoring and detecting changes in the S-parameters to determine whether a device in the guided electromagnetic transmission network 100 (e.g., a smart node) is no longer functioning correctly. In addition, the controller 66 can perform an S-parameter coefficient analysis to determine if failures have occurred in the waveguides. Since the controller 66 and various devices in the network 100 (e.g., smart nodes 68*a*, 68*b*) inherently have the ability to control RF signals (e.g., amplitude, phase, etc.), the devices and/or controller 66 can be used to perform in situ PHM by interrogating the network (e.g., by periodically performing an S-parameter coefficient analysis) to determine whether any faults have occurred, which nodes are functioning incorrectly, and/or where in the waveguide network there are failures.

With continued reference to FIG. 2, a transmission path (TP) between the controller 66 and nodes 68*a*, 68*b* can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68*a*, 68*b* can transmit power and signals.

The example nodes 68*a*, 68*b* may include radio-frequency (RF) identification devices along with processing, memory and/or the interfaces to connect to conventional sensors or actuators, such as solenoids or electro-hydraulic servo valves. In one or more non-limiting embodiments, the nodes 68*a*, 68*b* include a smart node coupled with an RF adapter. The smart node is configured to facilitate compatibility between a digital or analog data protocol of a sensor included in the smart node 68*a*, 68*b* and the RF data protocol of the controller 66.

In one or more non-limiting embodiments, the smart node includes one or more antennas and a transceiver processor. The antenna is configured to transmit and receive a RF signal to and from the smart node. The transceiver processor is configured to convert the RF signal into a data signal (e.g., a digital signal or analog signal) that is compatible with the smart node 68*a*. 68*b*. Similarly, the transceiver processor is also configured to convert the output signal (e.g., a digital or analog output signal) into an RF signal.

The RF signals can be exchanged between the smart node 68*a*, 68*b* and the controller 66. For example, the controller 66 is capable of selecting one or more of the smart nodes (e.g., smart node 68*a*, and/or 68*b*) for interrogation and can command the smart node to transmit one or more interrogation signals with a known frequency associated to a selected smart node 68*a*, 68*b*. The interrogation includes, for example, a smart node fault diagnostic to determine whether one or more smart nodes (e.g., smart node 68*a*, 68*b*) is working properly by sending a signal through the node and monitoring the response. The response can indicate whether the smart node (e.g., sensor, actuator, effector, etc.) is cracked, broken, clogged, seized, or otherwise not operating properly.

The waveguides 170, 171, 172, 173*a-c*, and/or 174*a-b* can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and provide unauthorized access to information. In some embodiments, guided electromagnetic radiation is in the range 1-100 GHz. Electromagnetic radiation can be more tightly arranged around specific carrier frequencies, such as 3-4.5 GHZ, 24 GHz, 60 GHz, or 76-77 GHz as examples in the microwave spectrum. A carrier frequency can transmit electric power, as well as communicate information, to multiple nodes 68*a*, 68*b* using various modulation and signaling techniques.

The nodes 68a with actuators 102 may include control devices, such as a solenoid, switch or other physical actuation devices. Radio frequency identification, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

The guided electromagnetic transmission network 100 may be installed in a mixed temperature environment, such as a machine having a hotter portion and a cooler portion. In reference to the example of FIG. 1, the fan section 22 and compressor section 26 of the gas turbine engine 20 can be designated as cooler portions relative to hotter portions of the gas turbine engine 20, such as the combustor section 26 and turbine section 28. To further accommodate the temperature variations within the gas turbine engine 20, a variety of approaches can be used. As one example, electronics devices within the nodes 68a, 68b, actuators 102, and/or sensors 104 can include wide band gap semiconductor devices, such as silicon carbide or gallium nitride devices supporting higher operating temperatures than typical semiconductor devices. Further, the controller 66 is operable to communicate with the network of nodes 68a, 68b through the two or more radio frequencies using a higher frequency to communicate with one or more of the nodes 68a, 68b in the cooler portion of the machine and a lower frequency to communicate with one or more of the nodes 68a, 68b in the hotter portion of the machine.

As an example, communication between the controller 66 and nodes 68a, 68b at the fan section 22 or compressor section 26 of the gas turbine engine 20 may use radio frequencies at or above 1 GHz, while communication to nodes 68a, 68b at the combustor section 26 or turbine section 28 may use frequencies at or below 1 GHz. The radio frequency threshold selected can depend on resultant heating effects that can occur at higher frequencies. Placement of the nodes 68a, 68b can also impact performance capabilities in the hotter portion of the machine. Where actuators 102 or sensors 104 are needed at locations that would potentially exceed the desired operating temperature of the nodes 68a, 68b that directly interface with the actuators 102 or sensors 104, relatively short-wired connections, referred to as "pigtails" can be used between the nodes 68a. 68b and the actuators 102 or sensors 104. The pigtail wiring can provide thermal separation and may support the use of legacy wired actuators 102 and sensors 104 to connect with nodes 68a. 68b. Further temperature accommodations may include cooling systems, heat sinks, and the like.

In some embodiments, shielding in the guided electromagnetic transmission network 100 can be provided such that power and communication signals are shielded from outside interference, which may be caused by environmental electromagnetic or optic interference. Moreover, the shielding limits intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, environmental phenomena, such as cosmic radio frequency radiation, lightning or other atmospheric effects, could interfere with local electromagnetic communications.

It should be appreciated that while the diagnostic system 64 is explained by way of example with regard to a gas turbine engine 20, other machines and machine designs can be modified to incorporate built-in shielding for monitored or controlled components in a guided electromagnetic transmission network. For example, the system 64 can be incorporated in a variety of harsh environment machines, such as manufacturing and processing equipment, a vehicle system, an environmental control system, and all the like. As a further example, the diagnostic system 64 can be incorporated in an aerospace system, such as an aircraft, rotorcraft, spacecraft, satellite, or the like. The disclosed system 64 includes the network 65, 100 that provides consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The diagnostic system 64 provides for a reduction in cable and interconnecting systems to reduce cost and increases reliability by reducing the number of physical interconnections. Reductions in cable and connecting systems further provides for a reduction in weight while enabling additional redundancy. Moreover, additional sensors can be added without the need for additional wiring and physical connections to the controller 66, which may provide for increased system accuracy and response. Embodiments can provide a "plug-n-play" approach to add a new node, potentially without a requalification of the entire system but only the new component; thereby greatly reducing qualification burdens.

Figure 3A:
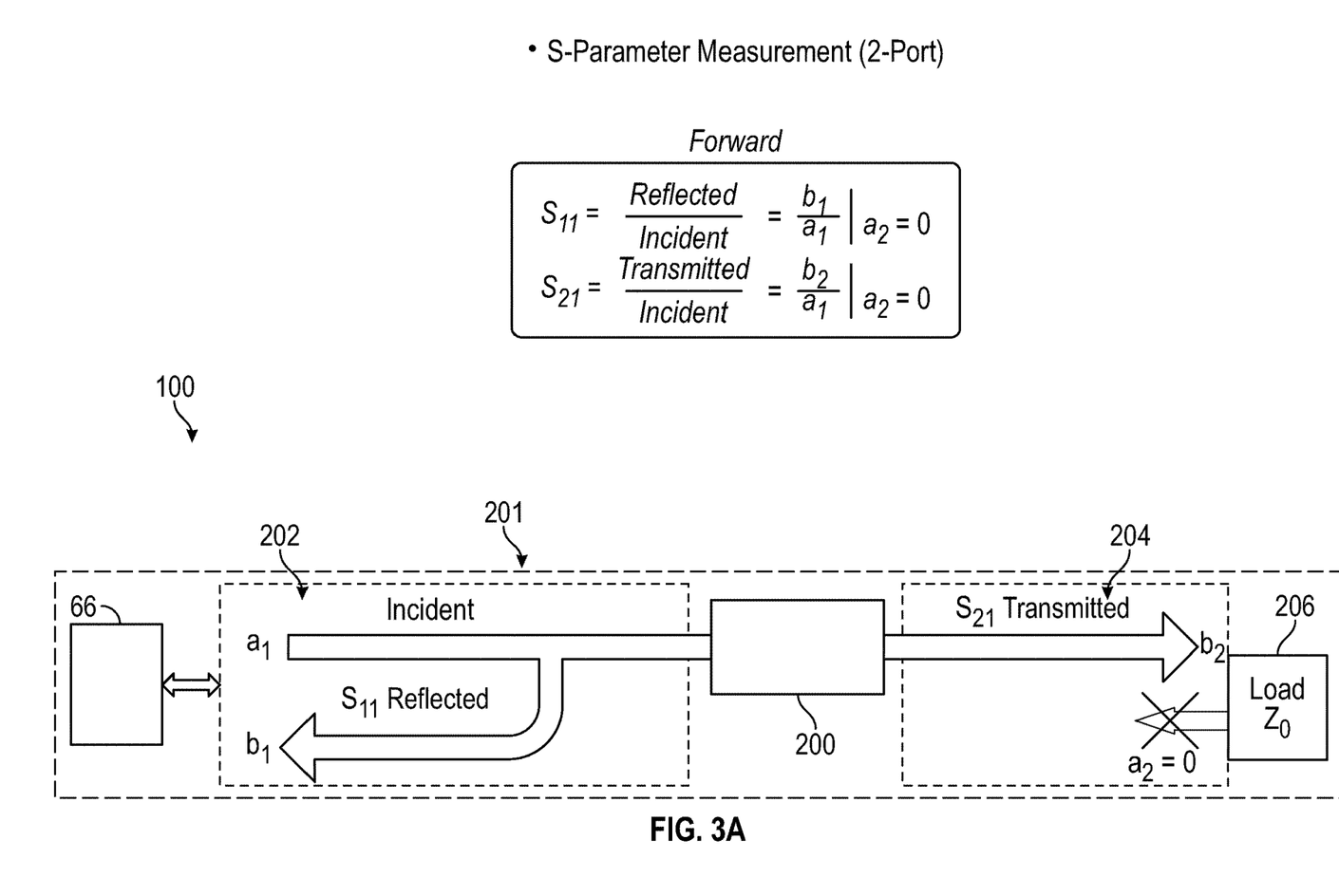
FIG. 3A is a diagram illustrating a forward S-parameter coefficient analysis according to a non-limiting embodiment.
Figure 3B:
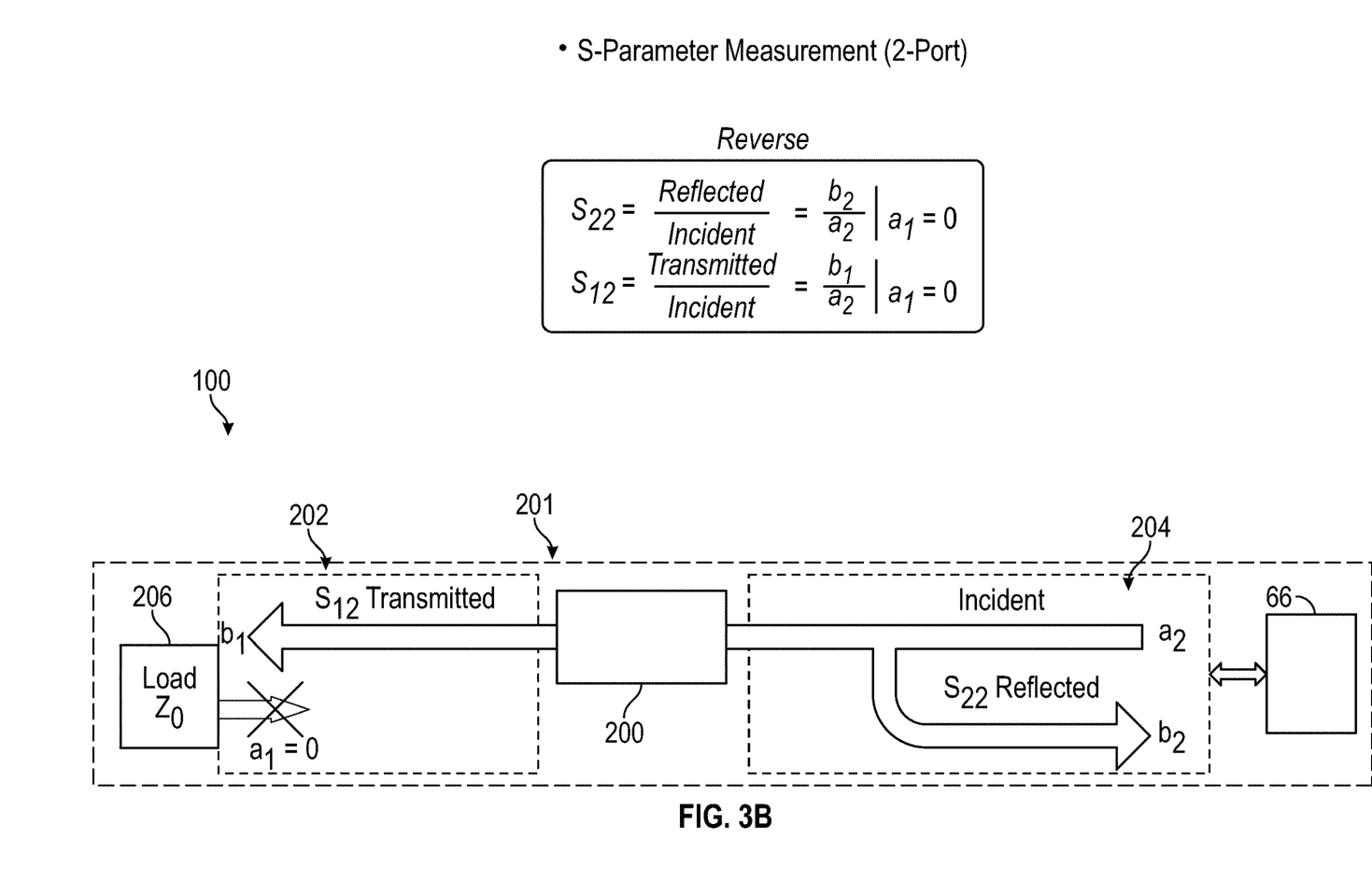
FIG. 3B is a diagram illustrating a reverse S-parameter coefficient analysis according to a non-limiting embodiment.

Referring now to FIGS. 3A and 3B, diagrams illustrating an S-parameter coefficient analysis performed by a waveguide and smart node fault diagnostic system 201 (also referred to herein as a fault diagnostic system 201) according to a non-limiting embodiment. The fault diagnostic system 201 can perform the S-parameter coefficient analysis using a vector network analyzer (VNA) included in controller 66 (e.g., FADEC). According to a non-limiting embodiment, the S-parameter coefficient analysis illustrated in FIGS. 3A and 3B is performed according to a two-port theory analysis associated with a two-port circuit. It should be appreciated, however, that a one-port theory analysis associated that a one-port circuit may be utilized without departing from the scope of the invention. Critical features of a vector network analyzer (S-parameters, time domain reflectometry (TDR), etc.) can be incorporated into the guided electromagnetic transmission network 100 through the interposer(s) 76 and smart nodes 68a, 68b.

The S-parameter coefficient analysis illustrated in FIGS. 3A and 3B can provide measurements pertaining to reflection coefficients and transmission coefficients. The reflection coefficient is indicative of an amount a signal wave (e.g., RF wave) is reflected by an impedance discontinuity in the channel transmission. The reflection coefficient can be expressed as a ratio of the amplitude of the reflected wave with respect to an amplitude of the incident wave.

The transmission coefficient is indicative of the transmission performance of the transmission line, e.g., the performance at which the transmission line transmits the signal wave. In one or more non-limiting embodiments, the transmission coefficient can provide information relating to the insertion loss of the transmission.

A two-port S-parameter measurement provides information on four S-parameters. The four S-parameters include: (1) an input/forward reflection coefficient (S11); (2) an input/forward transmission coefficient (S21); (3) a reverse transmission coefficient (S12); and (4) a reverse reflection coefficient (S22).

FIG. 3A, for example, depicts a forward S-parameter coefficient analysis performed on a portion of a guided electromagnetic transmission network 100 according to a non-limiting embodiment. The guided electromagnetic transmission network 100 includes a two-port device 200 such as a smart node, for example, which includes a first port 202 and a second port 204. The first port 202 is in signal communication with a controller 66 such as, for example, a FADEC 66. The second port 204 is in signal communication (e.g., via a second with a load 206 such as, for example, an actuator or a sensor. In one or more non-limiting embodiments, a first waveguide having a first end is connected to the controller 66 while an opposing second end is coupled to the first port 202 of the device 200. Likewise, a second waveguide having a first end is connected to the second port 204 of the device 200 while an opposing second end is coupled to the load 206.

The analyzed signal waves (e.g. RF interrogation waves) traveling through the guided electromagnetic transmission network 100 can include a traveling wave (a1) that is incident on the first port 202, a traveling wave (b1) reflected from the first port 202, and/or a traveling wave (b2) transmitted through the second port 204. In this example, there is no traveling wave (a2) incident on the second port 204, i.e., a2=0. Accordingly, the forward S-parameter coefficient analysis can determine the input/forward reflection coefficient (referred to as "S11") as the ratio of the traveling wave (b1) reflected from the first port 202 with respect to the traveling wave (a1) that is incident on the first port 202, i.e., S11=b1/a1. Likewise, the forward S-parameter coefficient analysis can determine the input/forward transmission coefficient (referred to as "S21") as the ratio of the traveling wave (b2) transmitted through the second port 204 with respect to the traveling wave (a1) that is incident on the first port 202, i.e., S21=b2/a1.

FIG. 3B depicts a reverse S-parameter coefficient analysis performed on the guided electromagnetic transmission network 100 shown in FIG. 3A according to a non-limiting embodiment. It should be appreciated that the controller 66 may or may not be the same controller 66 that is in signal communication with the first port 202 shown in FIG. 3A. Likewise, it should be appreciated that the load 206 may or may not be the same load 206 that is in signal communication with the second port 204 shown in FIG. 3A.

The analyzed signal waves (e.g. RF waves) traveling through the guided electromagnetic transmission network 100 illustrated in FIG. 3B can include a traveling wave (a2) that is incident on the second port 204, a traveling wave (b1) transmitted through the first port 202, and/or a traveling wave (b2) reflected from the second port 204. In this example, there is no traveling wave (a1) incident on the first port 202, i.e., a1=0. Accordingly, the reverse S-parameter coefficient analysis can determine the reverse reflection coefficient (referred to as "S22") as the ratio of the traveling wave (b2) reflected from the second port 204 with respect to the traveling wave (a2) that is incident on the second port 204, i.e., S22=b2/a2. Likewise, the reverse S-parameter coefficient analysis can determine the reverse transmission coefficient (referred to as "S12") as the ratio of the traveling wave (b1) transmitted through the first port 202 with respect to the traveling wave (a2) that is incident on the second port 204, i.e., S12=b1/a2.

According to a non-limiting embodiment, the controller 66 can calculate the various S-parameter coefficients associated with S11, S21, S22 and S12, and detect the presence of one or more faults in the guided electromagnetic transmission network 100. In a non-limiting embodiment, the controller 66 can compare a given S-parameter coefficient to a corresponding threshold value, and can determine whether a fault is present when the S-parameter coefficient does not satisfy a threshold value or threshold range, e.g., is greater than or less than the threshold value or threshold range, or is outside the threshold value or threshold range. In one more non-limiting embodiments, the threshold range can include a maximum threshold value (TH1) indicating a maximum or full amount of power or energy of a signal detected by the controller 66 and a minimum value (TH0) indicating no amount of power or energy detected by the controller 66.

For example, the controller 66 illustrated in FIG. 3A can calculate the input/forward reflection coefficient (S11), and compare the S11 coefficient to a S11 threshold range (e.g., 0.3 to 0.7). When the S11 coefficient is within the S11 threshold range, the controller 66 determines that no faults are present. When the S11 coefficient falls below the S11 threshold range (e.g., S11=0), the controller 66 can determine that no portion of the interrogation wave is reflected back to the first port 202, e.g., due to the load 206 completely absorbing the interrogation wave (e.g., an open circuit sensor), or due to the waveguide being disconnected such that the entire interrogation wave completed exits the network 100. When, however, the S11 coefficient exceeds the S11 threshold range (e.g., S11=1), the controller 66 can determine that the waveguide is completely crushed and is reflecting the entire interrogation wave back to the first port 202.

For example, the controller 66 illustrated in FIG. 3A can calculate the input/forward reflection coefficient (S11), and compare the S11 coefficient to a S11 threshold range (e.g., 0.3 to 0.7). When the S11 coefficient is within the S11 threshold range, the controller 66 determines that no faults are present. When the S11 coefficient falls below the S11 threshold range (e.g., S11=0), the controller 66 can determine that no portion of the interrogation wave is reflected back to the first port 202, e.g., due to the load 206 completely absorbing the interrogation wave (e.g., an open circuit sensor), or due to the waveguide being disconnected such that the entire interrogation wave completed exits the network 100. When, however, the S11 coefficient exceeds the S11 threshold range (e.g., S11=1), the controller 66 can determine that the waveguide is completely crushed and is reflecting the entire interrogation wave back to the first port 202.

In another example, the controller 66 illustrated in FIG. 3B can calculate the reverse reflection coefficient (S22), and compare the S22 coefficient to a S22 threshold range (e.g., 0.3 to 0.7). When the S22 coefficient is within the S22 threshold range, the controller 66 determines that no faults are present. When, however, the S22 coefficient falls below the S22 threshold range (e.g., S22=0), the controller 66 can determine that no portion of the interrogation wave is reflected back to the port 204, e.g., due to the load 206 completely absorbing the interrogation wave (e.g., an open circuit sensor), or due to the waveguide being disconnected such that the entire interrogation wave completed exits the network 100. When, however, the S22 coefficient exceeds the S22 threshold range (e.g., S22=1), the controller 66 can determine that the waveguide is completely crushed and is reflecting the entire interrogation wave back to the port 204.

According to a non-limiting embodiment, the controller 66 can store a look-up table (LUT) for each of the S-parameter coefficients S11, S21, S22, and S21. Each LUT maps pre-measured S-coefficients values to known faults or defects. In this manner, the controller 66 can compare a calculated S-parameter coefficient S11 to the S11 LUT, and determine that a fault or defect exists when the calculated S-parameter coefficient S11 matches a pre-measured S-coefficients value. For instances, the S11 LUT may include a pre-measured S-coefficient value of 1 that is mapped to a crushed waveguide fault, and a pre-measured S-coefficient value of 0.3 that is mapped to foreign object intrusion (e.g., water presence). Accordingly, when a calculated S-coefficient of 1 matches the pre-measured S-parameter value of 1 listed in the LUT, the controller 66 can determine that a crushed waveguide exists in the network 100. Likewise, when a calculated S-coefficient of 0.3 matches the pre-measured S-parameter value of 0.3 listed in the LUT, the controller 66 can determine that foreign object debris or water is present in the network 100.

According to at least one non-limiting embodiment, the controller 66 stores the location of each device 200 and/or load 206 within the guided electromagnetic transmission network 100. In this manner, when the controller 66 detects a fault using the S-parameter coefficient analysis described above, the controller 66 can identify the location or general area of the network 100 that contains the fault.

While discussed with respect to a gas turbine engine, it is understood that the communication system and method of diagnosis disclosed herein can used in any suitable system, machine, volume, device, apparatus, platform, etc.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fault diagnostic system, comprising:
a radio frequency network including a plurality of devices in signal communication with a plurality of nodes to exchange a plurality of signals, the RF network comprising:
a first device among the plurality of devices, the first device located at a first location;
a radio frequency transceiver at the first device;
a first waveguide among a plurality of waveguides, the first waveguide extending from a first end coupled to the first device to an opposing second end located at a second location;
a second device among the plurality of devices, the second device including a first port coupled to the second end of the first waveguide and including a second port coupled to a first end of a second wave guide;
a processor in signal communication with the first waveguide, the processor configured to:
transmit a first radio frequency signal among the plurality of signals through the first waveguide toward the second end;
receive a second radio frequency signal among the plurality of signals, the second radio frequency signal generated in response to the first radio frequency signal;
perform at least one S-parameter analysis based on the first radio frequency and the second radio frequency; and
determine a presence of a fault in the radio frequency network based on the at least one S-parameter analysis,
wherein the first radio frequency signal includes a first traveling wave that is incident on the first port, and the second radio frequency signal is a second traveling wave transmitted through the second port.

2. The fault diagnostic system of claim 1, wherein the at least one S-parameter analysis comprises:
determining at least one S-parameter coefficient based on the first radio frequency and the second radio frequency;
comparing the at least one S-parameter coefficient to a threshold; and
determining the presence of a fault in response to the at least one S-parameter coefficient being less than or greater than the threshold.

3. The fault diagnostic system of claim 1, wherein the first radio frequency signal includes a first traveling wave that is incident on the first port, and the second radio frequency signal is a second traveling wave reflected from the first port.

4. The fault diagnostic system of claim 3, wherein determining the at least one S-parameter coefficient includes determining an input/forward reflection coefficient as a ratio of the second traveling wave with respect to the first traveling wave.

5. The fault diagnostic system of claim 1, wherein determining the at least one S-parameter coefficient includes determining an input/forward transmission coefficient as a ratio of the second traveling wave with respect to the first traveling wave.

6. The fault diagnostic system of claim 1, wherein the first radio frequency signal includes a first traveling wave that is incident on the second port, and the second radio frequency signal is a second traveling wave reflected from the second port.

7. The fault diagnostic system of claim 6, wherein determining the at least one S-parameter coefficient includes determining an reverse reflection coefficient as a ratio of the second traveling wave with respect to the first traveling wave.

8. The fault diagnostic system of claim 1, wherein the first radio frequency signal includes a first traveling wave that is incident on the second port, and the second radio frequency signal is a second traveling wave transmitted through the first port.

9. The fault diagnostic system of claim 8, wherein determining the at least one S-parameter coefficient includes determining a reverse transmission coefficient as a ratio of the second traveling wave with respect to the first traveling wave.

10. A method of detecting a fault in a radio frequency network including a plurality of devices in signal communication with a plurality of nodes to exchange a plurality of signals, the method comprising:
transmitting a first radio frequency signal from a first device among the plurality of devices at a first location of the radio frequency network;
delivering the first radio frequency signal from a first end of a first waveguide coupled to the first device toward an opposing second end of the waveguide, the second end located at a second location of the radio frequency network;
receiving a second radio frequency signal at the first device, the second radio frequency signal generated in response to the first radio frequency signal;
delivering at least one of the first radio frequency signal and the second radio frequency signal to a second device including a first port coupled to the second end of the waveguide and including a second port coupled to a first end of a second wave guide, wherein the first radio frequency signal includes a first traveling wave that is incident on the first port, and the second radio frequency signal is a second traveling wave transmitted through the second port;
performing at least one S-parameter analysis based on the first radio frequency and the second radio frequency; and
determining a presence of a fault in the radio frequency network based on the at least one S-parameter analysis.

11. The method of claim 10, wherein determining the at least one S-parameter analysis comprises:
determining at least one S-parameter coefficient based on the first radio frequency and the second radio frequency;
comparing the at least one S-parameter coefficient to a threshold; and
determining the presence of a fault in response to the at least one S-parameter coefficient being less than or greater than the threshold.

12. The method of claim 11, wherein the first radio frequency signal includes a first traveling wave that is incident on the first port, and the second radio frequency signal includes a second traveling wave reflected from the first port, and wherein determining the at least one S-parameter coefficient includes determining an input/forward reflection coefficient as a ratio of the second traveling wave with respect to the first traveling wave.

13. The method of claim 11, wherein determining the at least one S-parameter coefficient includes determining an input/forward transmission coefficient as a ratio of the second traveling wave with respect to the first traveling wave.

14. The method of claim 11, wherein the first radio frequency signal includes a first traveling wave that is incident on the second port, and the second radio frequency signal is a second traveling wave reflected from the second port, wherein determining the at least one S-parameter coefficient includes determining an reverse reflection coefficient as a ratio of the second traveling wave with respect to the first traveling wave.

15. The method of claim 11, wherein the first radio frequency signal includes a first traveling wave that is incident on the second port, and the second radio frequency signal is a second traveling wave transmitted through the first port, wherein determining the at least one S-parameter coefficient includes determining reverse transmission coefficient as a ratio of the second traveling wave with respect to the first traveling wave.

16. The method of claim 15, wherein the threshold includes a range with a maximum threshold value indicating a maximum amount of energy of a signal detected by the controller and a minimum value indicating no amount of energy detected by the controller, and
wherein the input/forward reflection coefficient having a value of 0 indicates an existing open circuit in the radio frequency network and the input/forward reflection coefficient having a value of 1 indicates a short circuit in the in the radio frequency network.

\* \* \* \* \*